US008022570B2

(12) United States Patent
Flickinger et al.

(10) Patent No.: US 8,022,570 B2
(45) Date of Patent: *Sep. 20, 2011

(54) SYSTEMS AND METHODS FOR LIGHTING CONTROL IN FLIGHT DECK DEVICES

(75) Inventors: Steven D. Flickinger, Arlington, WA (US); Ty A. Larsen, Everett, WA (US); Steven D. Ellersick, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 59 days.

This patent is subject to a terminal disclaimer.

(21) Appl. No.: 12/475,717

(22) Filed: Jun. 1, 2009

(65) Prior Publication Data

US 2009/0251069 A1 Oct. 8, 2009

Related U.S. Application Data

(63) Continuation of application No. 11/251,063, filed on Oct. 14, 2005, now Pat. No. 7,541,697.

(51) Int. Cl.
*B60L 1/14* (2006.01)

(52) U.S. Cl. ............ 307/10.8; 307/117; 307/18; 307/19

(58) Field of Classification Search .................. 307/117, 307/18, 19, 10.8
See application file for complete search history.

(56) References Cited

U.S. PATENT DOCUMENTS

| | | | | |
|---|---|---|---|---|
| 7,541,697 | B2 * | 6/2009 | Flickinger et al. | 307/117 |
| 2007/0103835 | A1 * | 5/2007 | Sorenson | 361/114 |
| 2008/0278297 | A1 * | 11/2008 | Steiner et al. | 340/310.17 |

* cited by examiner

*Primary Examiner* — Robert L DeBeradinis
(74) *Attorney, Agent, or Firm* — Caven & Aghevli LLC

(57) ABSTRACT

Systems and methods for illuminating flight deck devices are disclosed. In one embodiment, a flight deck panel illumination system includes at least one illuminated panel having at least one illumination source, and a power supply coupled to the at least one illumination source and to an electrical energy source that is configured to selectively provide a suitable power conversion mode in response to an applied signal. A processor is coupled to the power supply to generate the applied signal.

28 Claims, 7 Drawing Sheets

SYSTEMS AND METHODS FOR LIGHTING CONTROL IN FLIGHT DECK DEVICES

RELATED APPLICATIONS

This application is a continuation of U.S. patent application Ser. No. 11/251,063 to Flickinger, et al., filed Oct. 14, 2005, now U.S. Pat. No. 7,541,697, the disclosure of which is incorporated by reference herein in its entirety.

FIELD OF THE INVENTION

This invention relates generally to lighting control systems and methods, and more specifically, to systems and methods for the controlled lighting of flight deck devices on an aircraft.

BACKGROUND OF THE INVENTION

Aircraft flight deck instrument panels typically include integral lighting systems to illuminate the panel nomenclature and markings on displays and controls located on the panels. The integral lighting systems generally assist a flight crew in locating displays and controls while operating the aircraft. Accordingly, the flight deck illumination systems include panel lighting and associated control systems that provide illumination for various panels and further permits the light intensity of various lighting sources positioned on the panels to be controlled. Other flight deck lighting systems include master dim and test (MD&T) systems that are operable to control a lighting level on one or more flight deck annunciators (that may have more that a single lighting level, such as a "bright" and a "dim" setting), and to further provide illumination tests for the one or more flight deck annunciators. In the present context, a flight deck annunciator is understood to include an illumination source that is not ordinarily illuminated during normal flight operations, and which is activated upon the detection of a predetermined fault or alarm condition in an associated system. Other panel lighting systems may optionally include a Master Brightness Control System, that is operable to override all flight deck panel back lighting levels, while still allowing minor localized adjustments to be made by use of the local lighting zone controls.

FIG. 1 is a block diagrammatic view of a panel lighting system 10 according to the prior art. The system 10 includes a plurality of lighted panels 12 that further include one or more illumination sources 14. The lighted panels 12 are coupled to an electrical energy source 16 through one or more dimmer control units (DCU) 18. Each DCU 18 is operable to convert a voltage and/or current received from the source 16 (e.g., 115 volts, AC) to a suitable voltage and/or current for the illumination sources 14 located in the lighted panels 12 (e.g., 5 volts AC), and to provide other necessary control functions. A desired illumination level on the lighted panels 12 is controlled by adjusting a control potentiometer 20 that is coupled to the DCU's 18. Although the foregoing panel lighting system 10 is generally effective to achieve a desired level of illumination from the sources 14, drawbacks nevertheless exist. For example, numerous DCU's 18 are generally required, which undesirably increases the weight and expense of the aircraft. In addition, if the foregoing Master Brightness Control System feature is included in the system 10, complicated analog circuitry is generally installed between the control potentiometers 20 and DCU 18, which also adds weight and expense to the aircraft. Still further, electrical conductors that couple the DCU's 18 to respective panels 12 generally vary in length, which undesirably contributes to non-uniform illumination of the panels 12 due to voltage drops occurring along the conductors. Accordingly, considerable redesign and/or rework efforts may be required to balance the voltage drops so that a relatively uniform panel illumination level is achieved.

FIG. 2 is a block diagrammatic view of a master dim and test (MD&T) system 30 according to the prior art. The system 30 includes a plurality of annunciator panels 32 that include one or more illuminated annunciators 34. The annunciator panels 32 are coupled to a suitable electrical energy source 36 through a plurality of master dim and test (MD&T) cards 38 that are generally positioned within a MD&T card file 40. The MD&T cards 38 are configured to provide lighting power (which may be variable if the system 30 is configured to permit bright and dim levels to be selected) to selected annunciators 34 so they may activate at a desired illumination level upon receiving an appropriate actuating signal from an associated system. As noted above, the MD&T system 30 also provides test capability for all annunciators located on the flight deck. Accordingly, the MD&T cards 38 generally include various logic circuits that are responsive to the actuating signal, and further include logic circuits to suitably control various test modes for each of the annunciator panels 32. Although the foregoing system 30 suitably provides the power, logic and illumination control for the panels 32, a principal drawback associated with the system 30 is that the MD&T cards 38 may be incorrectly installed within the MD&T card file 40 so that a desired dim and/or test function is not achieved. Furthermore, a failure in a single card or even a single annunciator within a circuit may result in the improper activation of multiple annunciators, since control is typically achieved using various switches and logic to provide a circuit path to ground. The MDT card file 40 also undesirably occupies a significant volume within the aircraft and adds considerable weight and cost to the aircraft.

It would therefore be desirable to have flight deck panel illumination systems that occupy less volume and are generally lighter and less expensive than present flight deck panel illumination systems. Furthermore, it would be desirable to have flight deck panel illumination systems that substantially avoid rework and reconfiguration of the systems in order to achieve relatively uniform illumination levels in illumination sources positioned on the flight deck panel.

SUMMARY

The present invention comprises systems and methods for illuminating flight deck devices. In one aspect, a flight deck panel illumination system includes at least one illuminated panel having at least one illumination source, and a power supply coupled to the at least one illumination source and to an electrical energy source. The power supply is configured to selectively provide a suitable power conversion mode in response to an applied signal, thereby allowing control of lighting levels. A processor is coupled to the power supply to receive lighting control system signals and to control the power supply through the application of a suitable signal.

BRIEF DESCRIPTION OF THE DRAWINGS

Embodiments of the present invention are described in detail below with reference to the following drawings.

DETAILED DESCRIPTION

The present invention relates to systems and methods for aircraft flight deck illumination. Many specific details of certain embodiments of the invention are set forth in the following description and in FIGS. 3 through 7 to provide a thorough understanding of such embodiments. One skilled in the art, however, will understand that the present invention may have additional embodiments, or that the present invention may be practiced without several of the details described in the following description.

Figure 3:
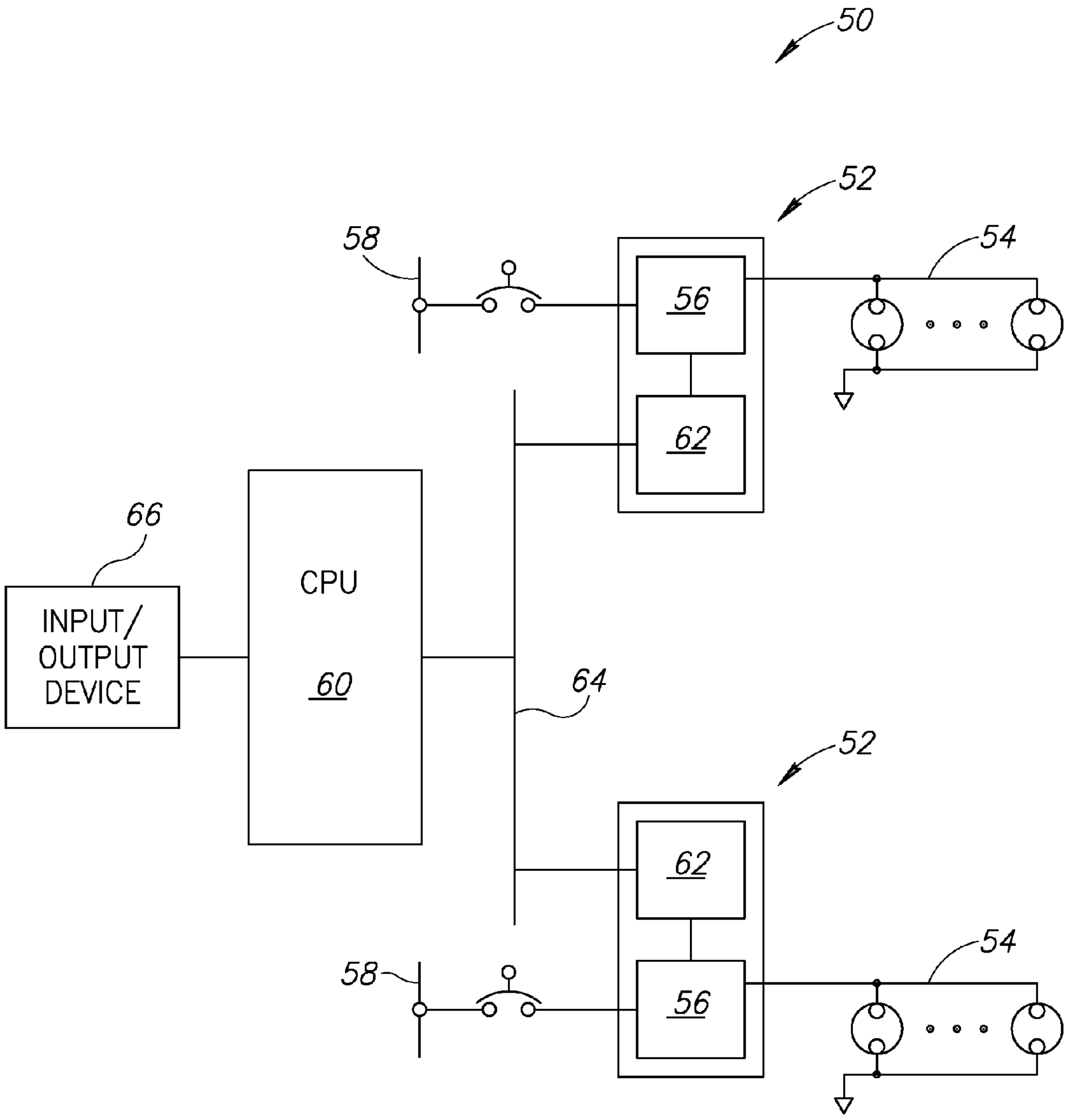
FIG. 3 is a diagrammatic block view of a flight deck illumination system 50 according to an embodiment of the invention.

FIG. 3 is a diagrammatic block view of a flight deck illumination system 50 according to an embodiment of the invention. The system 50 includes at least one lighted panel 52 that further includes one or more illumination sources 54 that are configured to provide illumination to various panel controls, such as switches, push buttons or other similar controls as well as backlighting for panel text and graphics. The sources 54 may also provide illumination to nomenclature positioned on various displays. The illumination provided by the sources 54 may be continuous, so that a selected device is illuminated when power is applied to the aircraft, or alternately, the sources 54 may be coupled to annunciation systems so that the sources 54 are illuminated only when a predetermined operational condition is encountered. For example, a high and/or low voltage and/or current level on an electrical bus may constitute an operational condition that actuates a selected annunciation system that, in turn, illuminates a selected one of the illumination sources 54. The illumination sources 54 may include solid-state devices, such as light emitting diodes (LED's) and fiber optic devices. Alternately, the illumination sources 54 may include conventional incandescent illumination sources. The sources 54 may be continuously dimmable, so that a desired level may be selected for panel backlighting and display systems.

The illumination sources 54 are coupled to a power supply 56 that is further coupled to a suitable electrical energy supply bus 58, which may be an alternating current (AC) bus, or a direct current (DC) bus. Further, the supply bus 58 may provide AC or DC energy at any selected voltage and/or current level or frequency typically provided by aircraft power supply systems. For example, the voltage and/or current level may include 115 volts 400 Hertz, 24 volts 400 Hertz, 28 volts DC or other known aircraft supply voltages. The power supply 56 is further configured to convert electrical energy received from the bus 58 into an output voltage and/or current that is suitable for the illumination sources 54. Accordingly, the supply 56 may include various power conversion devices that are operable to provide various power conversion modes. For example, the supply 56 may include one or more transformers so that, in a first power conversion mode, an AC voltage and/or current received from the bus 58 is converted to a different AC voltage and/or current. The supply 56 may also include suitable power rectification circuits to provide a second conversion mode, so that an AC voltage and/or current received from the bus 58 is converted to a desired DC voltage and/or current. The supply 56 may also include suitable inverter circuits (including suitable pulse-width modulation circuits) to provide a third power conversion mode, so that a DC voltage and/or current received from the bus 58 is converted to a desired AC voltage and/or current. DC-to-DC conversion circuits may also be present in the supply 56, so that in a fourth conversion mode, a DC voltage and/or current is received from the bus 58, and is converted to another DC voltage and/or current. In any case, the power supply 56 is further configured to select an appropriate power conversion mode by receiving appropriate digital signals from a central processing unit (CPU) 60, which will be described in further detail below. The power supply 56 may also include suitable power regulation and isolation circuits so that variations in the voltage and/or current at the bus 58 do not affect an illumination level at the sources 54.

The lighted panel 52 also includes a data receiver and/or microprocessor 62 that is operable to receive data signals from the CPU 60 through a communications system 64. In one particular embodiment, the communications system 64 is a simplex data bus that is configured to exchange signals with the data receiver 62 and the CPU 60 in accordance with the ARINC 429 data exchange protocol. In another particular embodiment, the communications system 64 is a multiplex data bus that is configured to exchange signals with the data receiver 62 and the CPU 60 in accordance with the ARINC 629 data exchange protocol. In other embodiments, other data exchange protocols may be used. For example, in other particular embodiments, the CAN bus data exchange protocol, and the ARINC 664 data exchange protocol may also be used. In addition, other suitable protocols, such as Ethernet and RS485 may also be used. The communications system 64 may be a dedicated communications system so that the system only communicates data signals between the CPU 60 and the panel 52. Alternately, the communications system 64 may be at least a portion of a shared communications system that is operable to communicate data signals between the CPU 60 and the panel 52, while also communicating data signals between various other devices within the aircraft. The communications system 60 may include metallic conductors to convey the data signals. Alternately, the system 60 may include optical fibers, so that the data signals are communicated by modulated light sources. The communications system 60 may also be configured to communicate data signals by wireless means, such as light and/or radio frequency modes.

Figure 1:
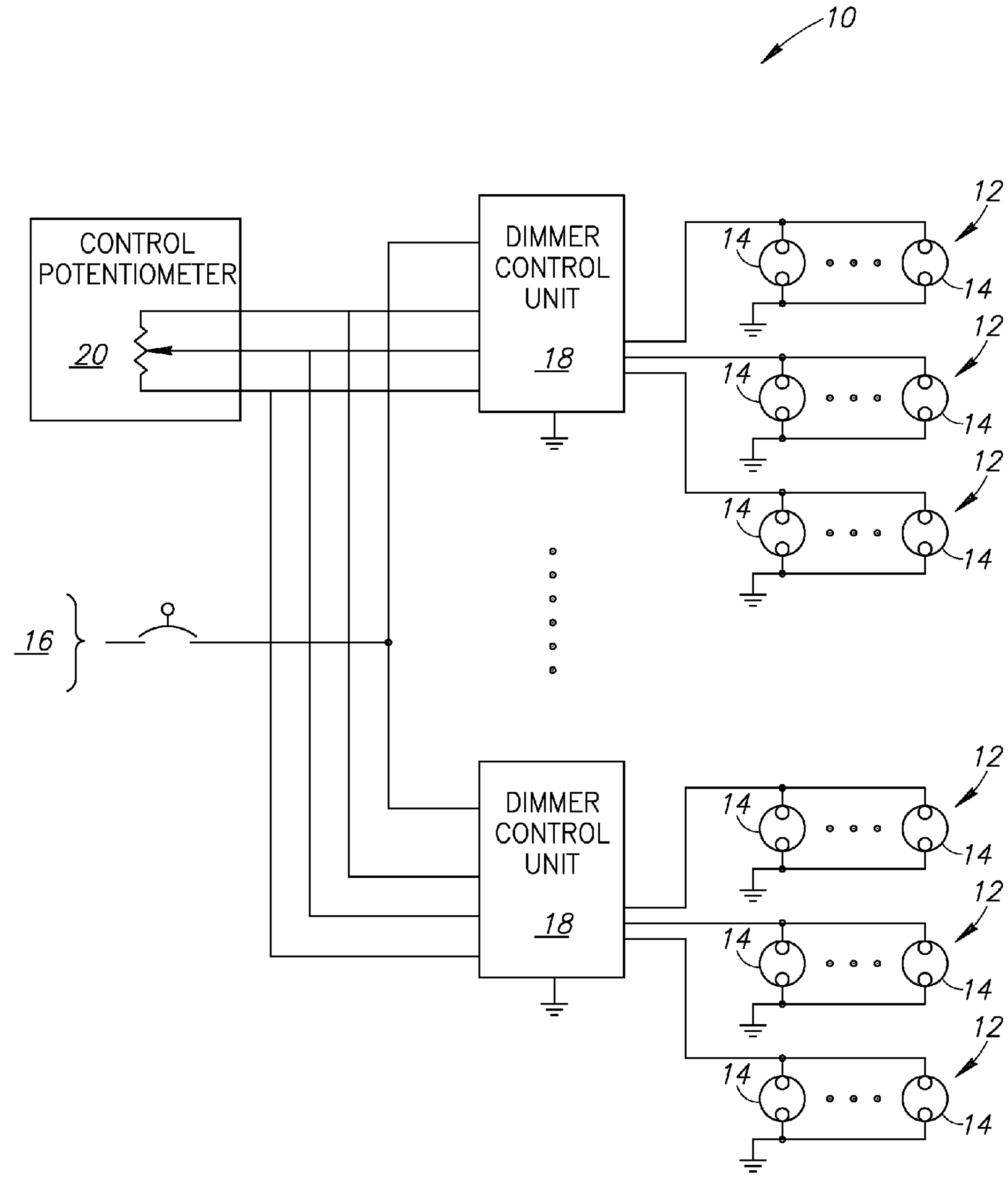
FIG.1 (PRIOR ART)
FIG. 1 is a block diagrammatic view of a panel lighting system according to the prior art.
Figure 2:
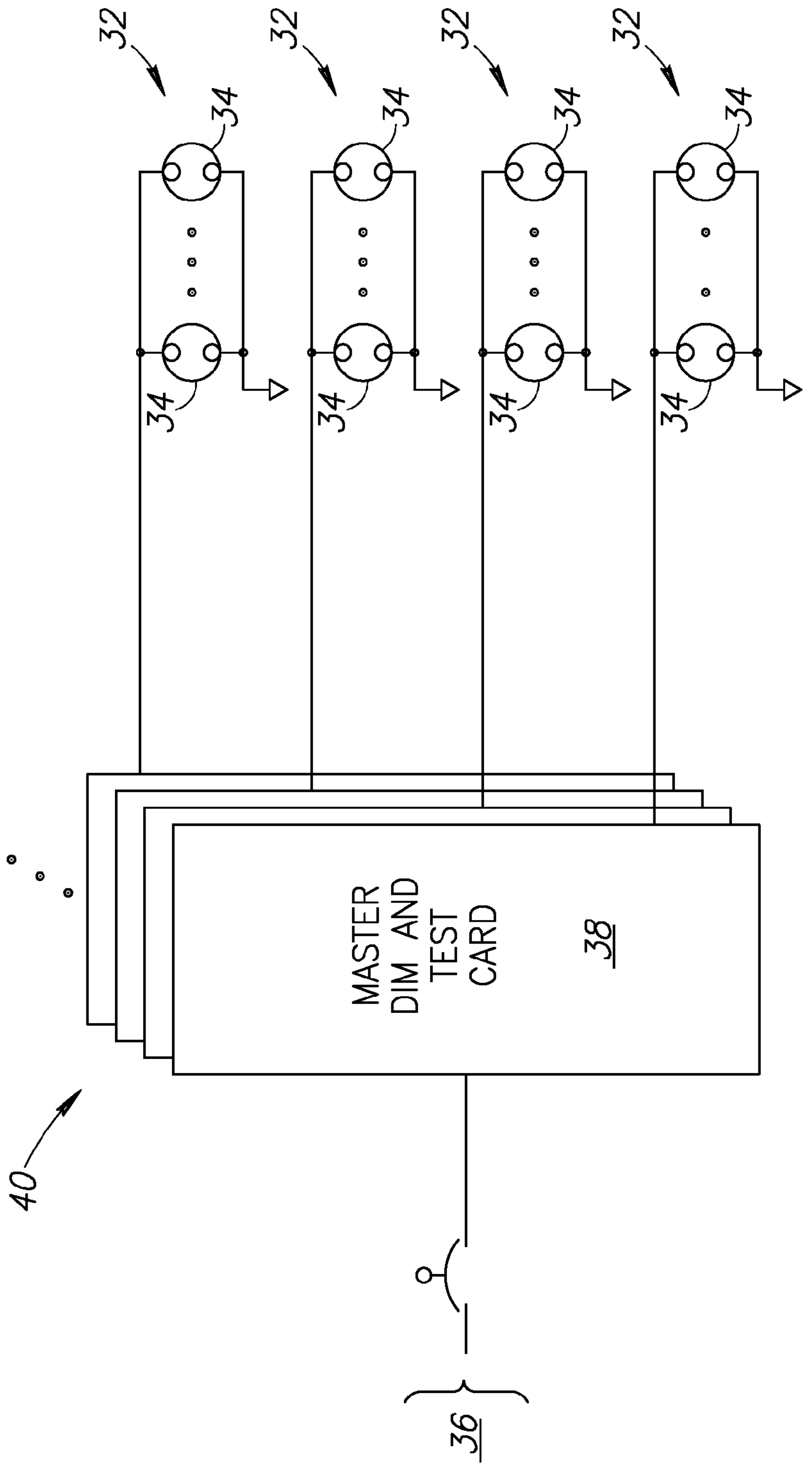
FIG. 2 (PRIOR ART)
FIG. 2 is a block diagrammatic view of a master dim and test (MD&T) system according to the prior art.

With continued reference to FIG. 3, the CPU 60 is operable to receive programmed instructions and data, and to process the data according to the received instructions. Accordingly, the CPU 60 may be comprised of suitable control circuits, microprocessors, application specific integrated circuits (ASIC) field-programmable gate arrays (FPGA), or other similar devices. The CPU 60 may be programmed to provide a desired illumination level at the lighted panel 52 by controlling a voltage and/or a current output from the power supply 56 to the illumination sources 54. Although the CPU 60 is shown as a single unitary device, it is understood that the CPU 60 may include a plurality of CPU devices that are physically spaced apart that cooperatively perform the function of the CPU 60. When an illumination source 54 is utilized as an annunciator, the CPU 60 is further operable to execute an appropriate test sequence so that the functionality of the selected annunciators may be verified. Accordingly, the CPU 60 may include built-in test equipment devices (BITE) that include executable instructions for a predetermined test sequence that is automatically executed when electrical power is applied to the electrical bus 58. Alternately, the BITE test sequence may be executed upon receipt of an appropriate command from a flight crewmember so that the operation of a selected annunciator may be verified at any time. The CPU 60 is further coupled to an input/output device 66 that supports user interaction with the CPU 60. For example, the device 66 may include a potentiometer that may be suitably adjusted to provide a desired illumination level at the sources 54. Alternately, a light sensor may also be used, that generally avoids the manual adjustment of a potentiometer. The device 66 may include other devices, such as a visual display terminal (not shown in FIG. 1) that allows information generated by the CPU 60 to be viewed, and that also permits information to be transferred to the CPU 60, by means of a keyboard, a touch screen apparatus, a mouse, or other similar devices.

The operation of the system 50 of FIG. 3 will now be described. Upon installation of the panel 52 in the flight deck, a suitable digital signal is communicated from the CPU 60 to the receiver 62 through the communications system 64. The digital signal identifies the panel 52 to the CPU 60 and permits the power supply 56 to select an appropriate power conversion mode so that a suitable output voltage and/or output current is provided to the panel 52. Once a power conversion mode is appropriately selected, a desired illumination level may be set by providing suitable information to the CPU 60 through the input/output device 66. If it is desired to test the function of the panel 52, or to verify the operating status of a selected source 54 that is used as an annunciator, suitable instructions may be received by the CPU 60 and executed to verify proper operation of the panel 52 and the sources 54.

Figure 4:
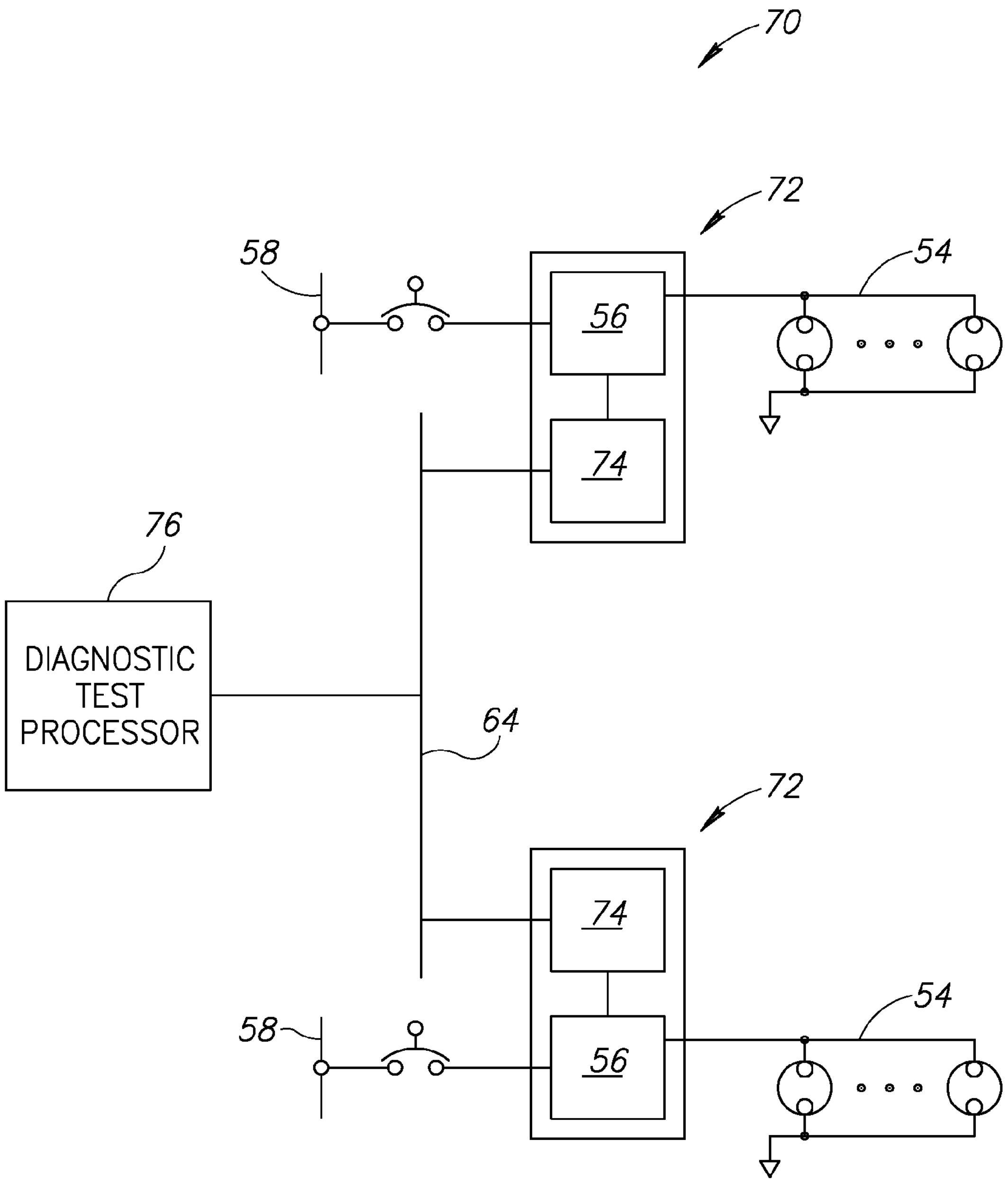
FIG. 4 is a diagrammatic block view of a flight deck illumination system according to an embodiment of the invention.

FIG. 4 is a diagrammatic block view of a flight deck illumination system 70 according to another embodiment of the invention. Various details of the system 70 are discussed in connection with the previous embodiment, and in the interest of brevity, will not be described further. The system 70 includes at least one lighted panel 72 including one or more illumination sources 54 that are configured to illuminate to various portions of the one or more panels 72. The illumination sources 54 may be configured to continuously illuminate a selected panel control, or the sources 54 may be coupled to annunciation systems so that the sources 54 are configured as annunciators that are illuminated only when a predetermined operational condition is encountered. In either case, the panel 72 includes dedicated processor 74 (or other suitable control circuit) that is configured to communicate with the communications system 60 and to execute various pre-programmed functions related to panel illumination and/or annunciation. In particular, the dedicated processor 74 is operable to receive data signals that indicate a desired illumination level for the sources 54 positioned on the panel 72, and to correspondingly control the power supply 56 to achieve the desired illumination level. In addition, the dedicated processor 74 is operable to receive a suitable signal from an annunciation system, and to illuminate an appropriate source 54 on the panel 72 in response to the signal. The dedicated processor 74 may also include BITE, as previously described, so that the one or more of the sources 54 that provide annunciation may be tested.

The system 70 may also include a diagnostic test processor 76 that may be removably coupled to the system 70. The processor 76 is operable to subject the system 70 to a diagnostic procedure, and to provide a user of the processor 76 with one or more results of the procedure. For example, the diagnostic procedure may be used to identify a malfunction in a specific one of the panels 76 and/or provide other diagnostic information for the system 70. In addition, the processor 76 may be used to implement various mandated test procedures, such as a system functional test (SFT) procedure that is employed to verify proper operation of a replacement portion of the system 70. For example, following the removal of a defective panel 76, successful performance of an appropriate SFT is generally required for the replacement panel. Additionally, the processor 76 may be used to balance illumination levels provided by the panels 72, as described more fully above. The diagnostic test processor 76 may include a personal computing device that is operable to receive and process the test instructions, execute the received instructions and display the results of the procedure. One suitable personal computing device is the Dell INSPIRON 9300 Notebook computer, available from Dell, Incorporated of Dallas, Tex., although other suitable alternatives exist.

Figure 5:
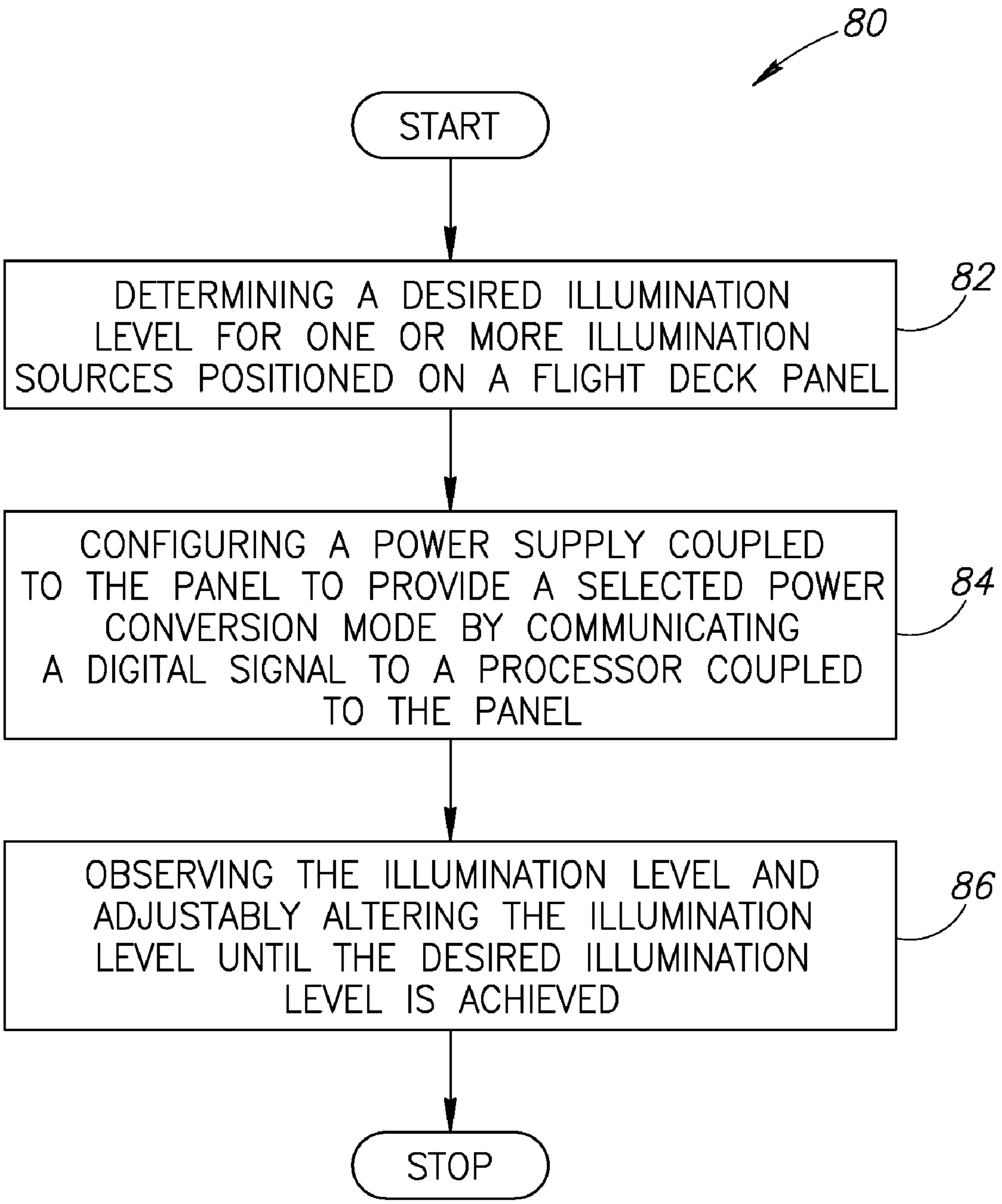
FIG. 5 is a flowchart that describes a method of controlling an illumination level on a flight deck panel according to another embodiment of the invention.

FIG. 5 is a flowchart that will be used to describe a method 80 of controlling an illumination level on a flight deck panel according to another embodiment of the invention. At block 82, a desired illumination level for one or more illumination sources on a flight deck panel is determined. The desired level may be determined by observing a relative illumination level between various illumination sources on spaced apart flight deck panels, so that the illumination level achieves a “balanced” level. Alternately, the desired illumination level may be commanded by actuating a “storm” mode on a suitable control. The storm mode generally provides a higher illumination level to the illumination sources so that the illumination level may be observed by flight crew members when an elevated light level from a lightning discharge floods the flight deck. At block 84, a power supply coupled to the panel is configured to provide the desired illumination level by communicating a digital signal to a processor coupled to the panel. The power supply may also be configured to provide a desired voltage and/or current to the illumination sources from a selected electrical power source by sending an appropriate digital signal to the power supply. At block 86, an illumination level is observed and the level is adjustably altered until the desired illumination level is achieved.

Figure 6:
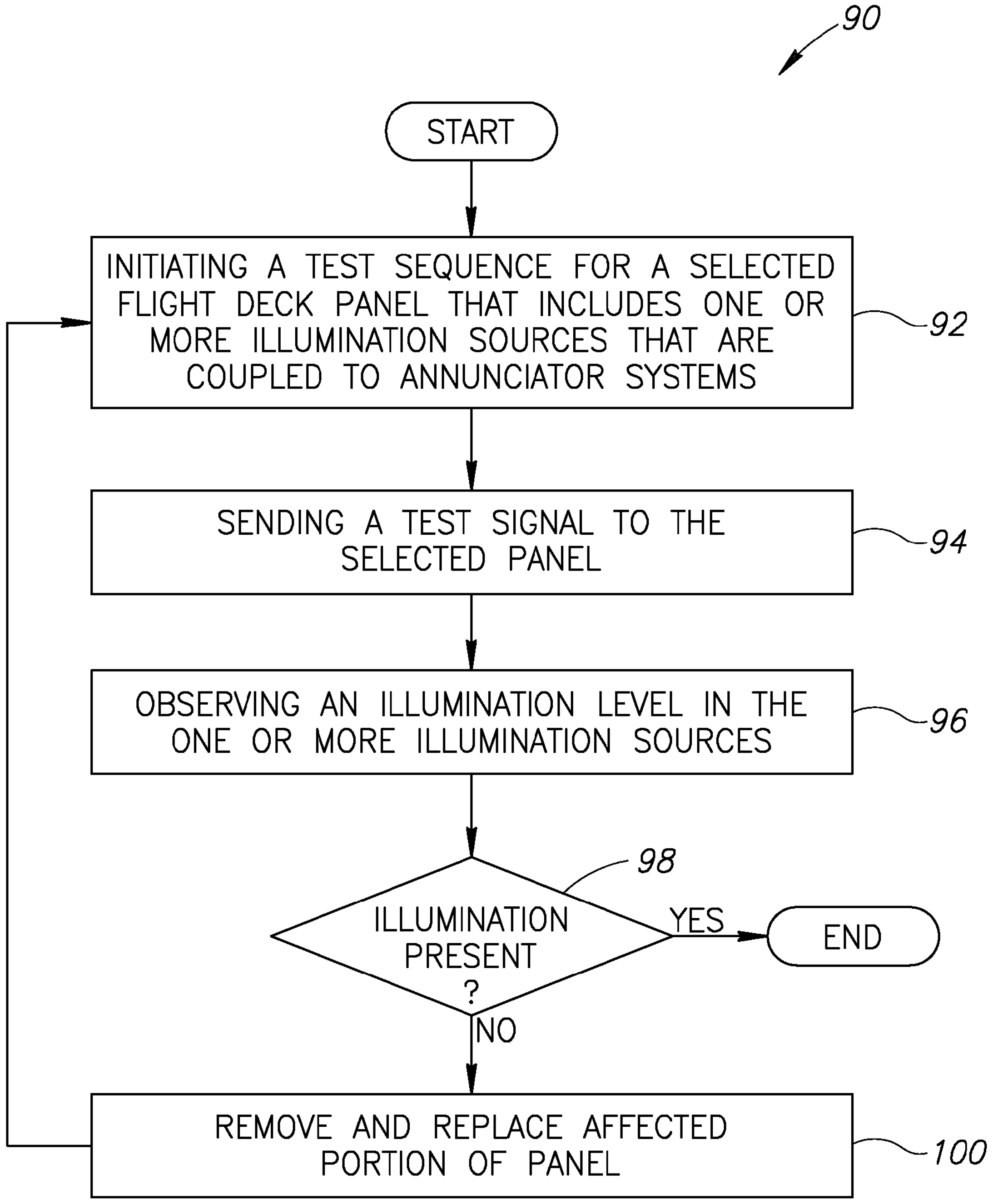
FIG. 6 is a flowchart that describes a method of testing one or more illumination sources on a flight deck panel, according to another embodiment of the invention.

FIG. 6 is a flowchart that will be used to describe a method 90 of testing one or more illumination sources on a flight deck panel, according to another embodiment of the invention. At block 92, a test sequence is initiated for a selected flight deck panel or panels that includes one or more illumination sources that are coupled to annunciation systems. The test sequence may be initiated by manually initiating the sequence by means of an appropriate flight deck control. Alternately, the test sequence may be initiated automatically when electrical power is coupled to an electrical bus that is coupled to the flight deck panel. At block 94, a test signal is transferred to the selected panel. The test signal is operable to illuminate the one or more illumination sources on the panel for a predetermined time period at a selected illumination level. At block 96, the illumination level in the one or more illumination sources may be observed to verify that the source illuminates at a desired level. At block 98, a visual observation of the sources occurs. If the desired level of illumination is observed, the method 90 terminates. If the desired level of illumination is not observed, at least a portion of the selected panel is malfunctioning. Accordingly, an affected portion of the panel may be removed and replaced, as shown at block 100. For example, one or more of the illumination sources may be replaced, or the entire panel may be replaced in order to restore the panel to functional status. In particular, after the panel is replaced, a functional test procedure may be performed in order to verify that the replacement panel is properly functioning. At block 100, the method 90 returns to block 92 so that the test sequence is performed again.

Figure 7:
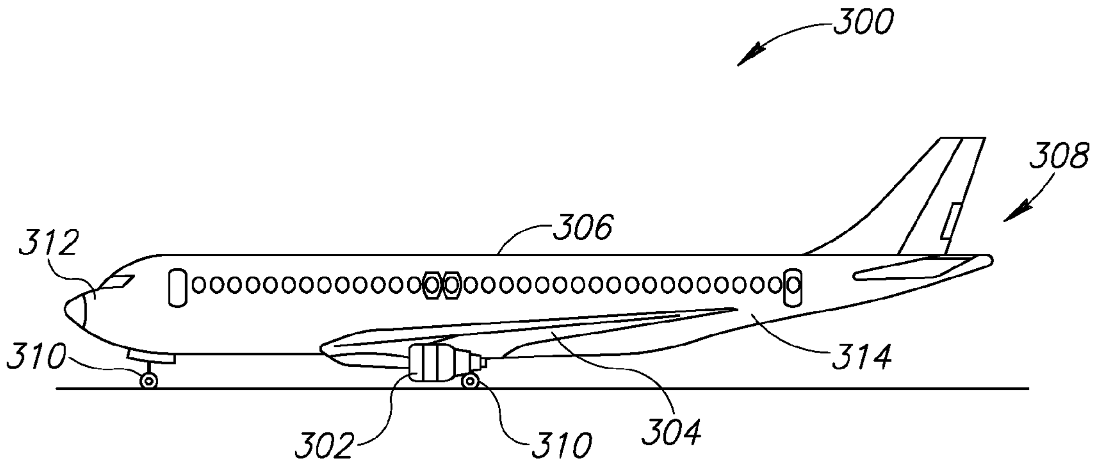
FIG. 7 is a side elevation view of an aircraft having one or more of the disclosed embodiments of the present invention.

The foregoing embodiments may be incorporated into a wide variety of different systems. Referring now to FIG. 7, a side elevation view of an aircraft 300 having one or more of the disclosed embodiments of the present invention is shown. With the exception of the embodiments according to the present invention, the aircraft 300 includes components and subsystems generally known in the pertinent art. For example, the aircraft 300 generally includes one or more propulsion units 302 that are coupled to wing assemblies 304, or alternately, to a fuselage 306 or even other portions of the aircraft 300. Additionally, the aircraft 300 also includes a tail assembly 308 and a landing assembly 310 coupled to the fuselage 306. The aircraft 300 further includes a flight control system 312 (not shown in FIG. 4), as well as a plurality of other electrical, mechanical and electromechanical systems that cooperatively perform a variety of tasks necessary for the operation of the aircraft 300. Accordingly, the aircraft 300 is generally representative of a commercial passenger aircraft, which may include, for example, the 737, 747, 757, 767 and 777 commercial passenger aircraft available from The Boeing Company of Chicago, Ill. Although the aircraft 300 shown in FIG. 7 generally shows a commercial passenger aircraft, it is understood that the various embodiments of the present invention may also be incorporated into flight vehicles of other types. Examples of such flight vehicles may include manned or even unmanned military aircraft, rotary wing aircraft, or even ballistic flight vehicles, as illustrated more fully in various descriptive volumes, such as Jane's All The World's Aircraft, available from Jane's Information Group, Ltd. of Coulsdon, Surrey, UK. In addition, various embodiments of the present invention may also be incorporated into other transportation vehicles of various types, which may include terrestrial vehicles.

With reference still to FIG. 7, the aircraft 300 may include one or more of the embodiments of the flight deck illumination system 314 according to the present invention, which may operate in association with the various systems and sub-systems of the aircraft 300. The system 314 may be configured to control an illumination level from an illumination source on a panel, and may also provide a test capability for various illumination sources that are coupled to annunciator systems, as previously discussed in detail.

While various embodiments of the invention have been illustrated and described, as noted above, many changes can be made without departing from the spirit and scope of the invention. Accordingly, the scope of the invention is not limited by the disclosure of the various embodiments. Instead, the invention should be determined entirely by reference to the claims that follow.

What is claimed is:

1. A flight deck panel illumination system, comprising:

a central processor; and a first lighted panel comprising:

a power supply coupled to an illumination source; and a microprocessor coupled to the central processor by a communication system;

wherein the central processor controls an illumination level of the first lighted panel by transmitting a digital signal from the central processor to the microprocessor to control an electrical output of the power supply wherein:

the illumination source is coupled to an annunciation system which illuminates the first lighted panel when a predetermined operational condition is encountered; and the microprocessor is further configured to receive an appropriate annunciation signal from the annunciation system when the condition is detected.

2. The system of claim 1, wherein the central processor is coupled to an input/output device that generates a digital signal indicative of an illumination level.

3. The system of claim 1, wherein the communication system comprises at least one of:

a simplex data bus;

a multiplex data bus;

an optical fiber; or a wireless communication link.

4. The system of claim 1, wherein the power supply provides:

a first power conversion mode to convert at least one of a first alternating current (AC) voltage and current received from the power supply bus to at least one of a second AC voltage and current;

a second power conversion mode to convert at least one of a direct current (DC) voltage and current received from the power supply bus to at least one of an AC voltage and current;

a third power conversion mode to convert at least one of an AC voltage and current received from the power supply bus to at least one of a DC voltage and current, and a fourth power conversion mode to convert at least one of a first DC voltage and current received from the power supply bus to at least one of a second DC voltage and current.

5. The system of claim 4, wherein:

upon installation of the first lighted panel the central processor transmits a digital signal to the first lighted panel which enables the power supply to select a power conversion mode.

6. The system of claim 1, wherein the central processor further comprises built-in-test equipment (BITE) to execute an appropriate test sequence to verify a function of the annunciator.

7. The system of claim 1, further comprising a diagnostic test processor removably coupled to the system to perform a selected diagnostic procedure.

8. The system of claim 1, further comprising:

a second lighted panel comprising:

a power supply coupled to an illumination source; and a microprocessor coupled to the central processor by a communication system;

wherein the central processor controls an illumination level of the second lighted panel by transmitting a digital signal from the central processor to the microprocessor to control an electrical output of the power supply.

9. The system of claim 1, wherein:

the central processor receives a signal from the input/output device indicating an illumination level for the first lighted panel; and in response to the signal, the central processor transmits a digital signal to the microprocessor; and the microprocessor adjusts a power output of the power supply.

10. An aircraft, comprising:

a fuselage;

a flight deck panel illumination system, comprising:

a central processor; and a plurality of lighted panels comprising:

a power supply coupled to an illumination source; and a microprocessor coupled to the central processor by a communication system;

wherein the central processor controls an illumination level of the plurality of lighted panels by transmitting a digital signal from the central processor to the microprocessor to control an electrical output of the power supply, wherein:

the illumination source is coupled to an annunciation system which illuminates the lighted panel when a predetermined operational condition is encountered; and the microprocessor is further configured to receive an appropriate annunciation signal from the annunciation system when the condition is detected.

11. The aircraft of claim 10, wherein the central processor is coupled to an input/output device that generates a digital signal indicative of an illumination level.

12. The aircraft of claim 10, wherein the communication system comprises at least one of:

a simplex data bus;

a multiplex data bus;

an optical fiber; or a wireless communication link.

13. The aircraft of claim 10, wherein the power supply provides:

a first power conversion mode to convert at least one of a first alternating current (AC) voltage and current received from the power supply bus to at least one of a second AC voltage and current;

a second power conversion mode to convert at least one of a direct current (DC) voltage and current received from the power supply bus to at least one of an AC voltage and current;

a third power conversion mode to convert at least one of an AC voltage and current received from the power supply bus to at least one of a DC voltage and current, and a fourth power conversion mode to convert at least one of a first DC voltage and current received from the power supply bus to at least one of a second DC voltage and current.

14. The aircraft of claim 10, wherein:

upon installation of a lighted panel the central processor transmits a digital signal to the lighted panel which enables the power supply to select a power conversion mode.

15. The aircraft of claim 10, wherein the central processor further comprises built-in-test equipment (BITE) to execute an appropriate test sequence to verify a function of the annunciator.

16. The aircraft of claim 10, further comprising a diagnostic test processor removably coupled to the system to perform a selected diagnostic procedure.

17. The aircraft of claim 10, wherein:

the central processor receives a signal from the input/output device indicating an illumination level for the first lighted panel; and in response to the signal, the central processor transmits a digital signal to the microprocessor; and the microprocessor adjusts a power output of the power supply.

18. A method of controlling an illumination level of one or more lighted panels on a flight deck, comprising:

receiving, in a central processor, a first signal indicative of an illumination level for a lighted panel on a flight deck;

in response to the signal, transmitting a second signal from the central processor to a microprocessor coupled to a power supply for the lighted panel; and generating a third signal in the microprocessor to adjust a power output of the power supply wherein:

the central processor controls an illumination level of the first lighted panel by transmitting a digital signal from the central processor to the microprocessor to control an electrical output of the power supply the illumination source is coupled to an annunciation system which illuminates a first lighted panel when a predetermined operational condition is encountered; and the microprocessor is configured to receive an appropriate annunciation signal from the annunciation system when the condition is detected.

19. The method of claim 18, wherein receiving, in a central processor, a first signal indicative of an illumination level for a lighted panel on a flight deck comprises receiving a signal from an input/output device.

20. A flight deck panel illumination system, comprising:

a central processor; and a first lighted panel comprising:

a power supply coupled to an illumination source; and a microprocessor coupled to the central processor by a communication system;

wherein the central processor controls an illumination level of the first lighted panel by transmitting a digital signal from the central processor to the microprocessor to control an electrical output of the power supply; and wherein the power supply provides:

a first power conversion mode to convert at least one of a first alternating current (AC) voltage and current received from the power supply bus to at least one of a second AC voltage and current;

a second power conversion mode to convert at least one of a direct current (DC) voltage and current received from the power supply bus to at least one of an AC voltage and current;

a third power conversion mode to convert at least one of an AC voltage and current received from the power supply bus to at least one of a DC voltage and current, and a fourth power conversion mode to convert at least one of a first DC voltage and current received from the power supply bus to at least one of a second DC voltage and current.

21. The system of claim 20, wherein the central processor is coupled to an input/output device that generates a digital signal indicative of an illumination level.

22. The system of claim 20, wherein:

the illumination source is coupled to an annunciation system which illuminates the first lighted panel when a predetermined operational condition is encountered; and the microprocessor is further configured to receive an appropriate annunciation signal from the annunciation system when the condition is detected.

23. The system of claim 20, wherein:

the central processor receives a signal from the input/output device indicating an illumination level for the first lighted panel; and in response to the signal, the central processor transmits a digital signal to the microprocessor; and the microprocessor adjusts a power output of the power supply.

24. A flight deck panel illumination system, comprising:

a central processor; and a first lighted panel comprising:

a power supply coupled to an illumination source; and a microprocessor coupled to the central processor by a communication system;

wherein the central processor controls an illumination level of the first lighted panel by transmitting a digital signal from the central processor to the microprocessor to control an electrical output of the power supply; and a diagnostic test processor removably coupled to the system to perform a selected diagnostic procedure.

25. The system of claim 24, wherein the power supply provides:

a first power conversion mode to convert at least one of a first alternating current (AC) voltage and current received from the power supply bus to at least one of a second AC voltage and current;

a second power conversion mode to convert at least one of a direct current (DC) voltage and current received from the power supply bus to at least one of an AC voltage and current;

a third power conversion mode to convert at least one of an AC voltage and current received from the power supply bus to at least one of a DC voltage and current, and a fourth power conversion mode to convert at least one of a first DC voltage and current received from the power supply bus to at least one of a second DC voltage and current.

26. The system of claim 24, wherein:

the illumination source is coupled to an annunciation system which illuminates the first lighted panel when a predetermined operational condition is encountered; and the microprocessor is further configured to receive an appropriate annunciation signal from the annunciation system when the condition is detected.

27. The system of claim 24, further comprising:

a second lighted panel comprising:

a power supply coupled to an illumination source; and a microprocessor coupled to the central processor by a communication system;

wherein the central processor controls an illumination level of the second lighted panel by transmitting a digital signal from the central processor to the microprocessor to control an electrical output of the power supply.

28. The system of claim 24, wherein:

the central processor receives a signal from the input/output device indicating an illumination level for the first lighted panel; and in response to the signal, the central processor transmits a digital signal to the microprocessor; and the microprocessor adjusts a power output of the power supply.

* * * * *